US012163637B2

(12) United States Patent
Haywood et al.

(10) Patent No.: US 12,163,637 B2
(45) Date of Patent: Dec. 10, 2024

(54) HEADLAMP FOR A VEHICLE

(71) Applicant: VALEO VISION, Bobigny (FR)

(72) Inventors: Drew Haywood, Seymour, IN (US); Sylvain Giraud, Seymour, IN (US); Yunfei Wang, Seymour, IN (US)

(73) Assignee: Valeo Vision, Bobigny (FR)

(*) Notice: Subject to any disclaimer, the term of this patent is extended or adjusted under 35 U.S.C. 154(b) by 0 days.

(21) Appl. No.: 18/316,013

(22) Filed: May 11, 2023

(65) Prior Publication Data

US 2024/0377042 A1    Nov. 14, 2024

(51) Int. Cl.
*F21S 41/19* (2018.01)
*F21S 41/657* (2018.01)
*F21S 45/47* (2018.01)

(52) U.S. Cl.
CPC ............. *F21S 41/19* (2018.01); *F21S 41/657* (2018.01); *F21S 45/47* (2018.01)

(58) Field of Classification Search
CPC .......... F21S 41/19; F21S 41/657; F21S 45/47
See application file for complete search history.

(56) References Cited

U.S. PATENT DOCUMENTS

| | | | | |
|---|---|---|---|---|
| 7,114,837 | B2 | 10/2006 | Yagi et al. | |
| 7,722,235 | B2 * | 5/2010 | Mochizuki | F21S 41/148 |
| | | | | 362/539 |
| 7,766,524 | B2 * | 8/2010 | Naganawa | F21S 41/635 |
| | | | | 362/531 |
| 7,985,013 | B2 * | 7/2011 | Yasuda | F21S 45/435 |
| | | | | 362/546 |
| 8,287,167 | B2 * | 10/2012 | Inaba | F21S 41/255 |
| | | | | 362/539 |
| 8,465,189 | B2 * | 6/2013 | Inoue | F21V 29/67 |
| | | | | 362/547 |
| 8,500,315 | B2 * | 8/2013 | Tokida | F21S 41/143 |
| | | | | 362/293 |
| 10,583,772 | B2 * | 3/2020 | Aizawa | F21S 41/147 |
| 11,092,308 | B2 * | 8/2021 | Matsumoto | F21S 41/365 |
| 2010/0124070 | A1 * | 5/2010 | Ochiai | F21S 41/295 |
| | | | | 362/512 |

FOREIGN PATENT DOCUMENTS

| | | |
|---|---|---|
| CN | 110081386 A | 8/2019 |
| EP | 3033248 B1 | 10/2018 |
| EP | 3489084 A1 | 5/2019 |
| WO | 2014080747 A1 | 5/2014 |
| WO | 2023274897 A1 | 1/2023 |

OTHER PUBLICATIONS

European Patent Office, International Search Report and Written Opinion of corresponding International Application No. PCT/US2024/028233, dated Aug. 1, 2024.

* cited by examiner

*Primary Examiner* — Arman B Fallahkhair

(74) *Attorney, Agent, or Firm* — Valeo Vision

(57) ABSTRACT

The present invention pertains to a lighting apparatus. The lighting apparatus includes a heatsink positioned within a housing, the heatsink encompasses plurality of modules to accommodate light sources and plurality of pivots provided on at least a plurality of edges of the heatsink, and a plurality of actuators positioned in the housing, with each of the plurality of actuators engaging with one of the plurality of pivots. The inventive concept further includes a headlamp for an automotive vehicle. The headlamp comprising a housing, at least one light source, and the lighting apparatus.

12 Claims, 5 Drawing Sheets

HEADLAMP FOR A VEHICLE

FIELD OF THE INVENTION

The present invention generally relates to an automotive vehicle lighting apparatus, and more particularly, to a heatsink applicable to a headlamp of the automotive vehicle.

BACKGROUND

Lighting devices are an integral part of automotive vehicles. Such lighting devices can represent various types such as headlamps, tail lamps, signal lamps, and the like, which can be used for different functions of the automotive vehicle. Different types of lighting devices are assembled in such a way to perform different lighting functions. For example, headlamps can include different components such as a light source, a reflector, a heat sink, housing, bracket and the like in order to provide a light output that enables a driver or vehicle operators with clear visibility of objects along the road. One design objective for vehicle headlights has been to mount the headlights to the vehicle so that they are adjustable. An aiming mechanism such as brackets and adjusters enable the headlamp to be moved in one of vertical or lateral direction. The brackets are coupled with the adjusters to enable movement of the headlamp in the automotive vehicle.

Conventionally, the brackets and adjusters coupled with the brackets are located external to the housing of the headlamp. The brackets are separate components that function as an interface between the headlamp and the automotive vehicle. Further, the brackets are commonly used when there can be multiple modules in the headlamp and the brackets interface with adjusters for global adjustment. However, the usage of additional brackets external to the housing of the headlamp results in additional time and increased complexity when adjusting the headlamp. Another disadvantage is the reduced tolerance of the headlamp when tested for vibration resonance frequency due to the presence of additional brackets and adjusters. Moreover, the usage of separate brackets external to the housing of the headlamp requires additional complex manufacturing assembly line thereby increasing manufacturing cost, increased assembly time, and personnel costs.

The "background" description provided herein is for purposes of presenting the general context of the disclosure. Work of the presently named inventors, to the extent it is described in this background section, as well as aspects of the description, which may not otherwise qualify as conventional art at the time of filing, are neither expressly nor impliedly admitted as conventional art against the present disclosure.

SUMMARY OF THE INVENTION

The present invention is directed to improved lighting devices for a vehicle that address at least one or more of the described issues mentioned previously. One potential benefit of the present invention over the prior art is that the lighting device is constructed and configured in such a way that the requirement of components external to headlamp housing such as brackets and external adjustors is eliminated. The reduction of entire component from the lamp results in increased cost savings during manufacturing of headlamps. In addition, due to reduced component stack in the headlamp assembly, the vibration resonance frequency of the headlamp is greatly improved. Further, the present invention enables lateral and vertical movement of the headlamp without the use of external adjustors and brackets generally used in the headlamps. Thus, the present invention achieves the same functionality of the headlamp despite the eliminated components. Moreover, the present invention has an additional benefit of providing internal adjusters that are enclosed within the housing of the headlamp. The internal adjusters ensures the vertical and lateral movement of the headlamp, enables the headlamp to be modular, and to be easily controlled by a user.

Accordingly pursuant to one aspect of the present invention, a lighting apparatus is contemplated, the lighting apparatus comprising a heatsink positioned within the housing, the heatsink includes a plurality of modules to accommodate light sources and a plurality of pivots provided on at least a plurality of edges of the heatsink, a plurality of actuators positioned in the housing, with each of the plurality of actuators engaging with one of the plurality of pivots. The heatsink can be designed such that the requirements of separate adjusters and brackets external to the housing is eliminated.

The invention can be further characterized by one or any combination of the features described herein, such as wherein the heatsink includes a plurality of fins extending outward.

The invention can be further characterized by one or any combination of the features described herein, such as wherein at least a portion of the heatsink is textured to reduce reflectivity.

The invention can be further characterized by one or any combination of the features described herein, such as wherein at least a portion of the heatsink is polished or coated with a reflective material.

The invention can be further characterized by one or any combination of the features described herein, such as wherein a plurality of light blockers are provided within the heatsink in close vicinity to the light source.

The invention can be further characterized by one or any combination of the features described herein, such as wherein a plurality of separators are provided within the heatsink in close vicinity of the plurality of modules.

The invention can be further characterized by one or any combination of the features described herein, such as wherein the heatsink is made of a thermally conductive material.

The invention can be further characterized by one or any combination of the features described herein, such as wherein each of the plurality of actuators is a stepper motor.

The invention can be further characterized by one or any combination of the features described herein, further comprises an external controller to actuate the plurality of actuators to position the heatsink within the housing.

The invention can be further characterized by one or any combination of the features described herein, such as wherein the heatsink further includes an aperture on the plurality of pivots such that the heatsink is adapted to receive the plurality of actuators to be engaged to the plurality of pivots through the aperture.

Accordingly pursuant to another aspect of the present invention, contemplated is a headlamp for an automotive vehicle. The headlamp includes a housing; at least one light source; a plurality of actuators, with the plurality of actuators being located within the housing; a heatsink, with the heatsink including at least one module to accommodate the at least one light source and a plurality of pivots which engage with the plurality of actuators for positioning the heatsink and aiming the at least one light source.

It should be appreciated that the above referenced aspects and examples are non-limiting, as other aspects exist within the present invention, as shown and described herein.

DESCRIPTION OF DRAWINGS

To further provide a more encompassing description and a better understanding of the invention, a set of drawings is provided. Said drawings form an integral part of the description and illustrate embodiment aspects of the invention, which should not be construed as restricting the scope of the invention, but only as examples of how the invention can be carried out. The drawings comprise the following characteristics.

DETAILED DESCRIPTION OF PREFERRED EMBODIMENTS

The present invention relates to an improved heatsink for a lighting device used in an automotive vehicle. The heat sink of the lighting device is configured such that components like housing adjusters and brackets are eliminated from the lighting device. The elimination of entire components from the lighting assembly results in reduction of costs during manufacture. Furthermore, a reduction of the required number of components for enabling the lighting apparatus enclosure reduces component costs and assembly times. Additionally, the heatsink of the lighting device is designed such that hot spots are reduced thereby contributing to beam pattern shaping at the output.

Unless defined otherwise, all technical and scientific terms used herein have the same meaning as commonly understood by one of ordinary skill in the art to which this technology belongs.

Figure 1:
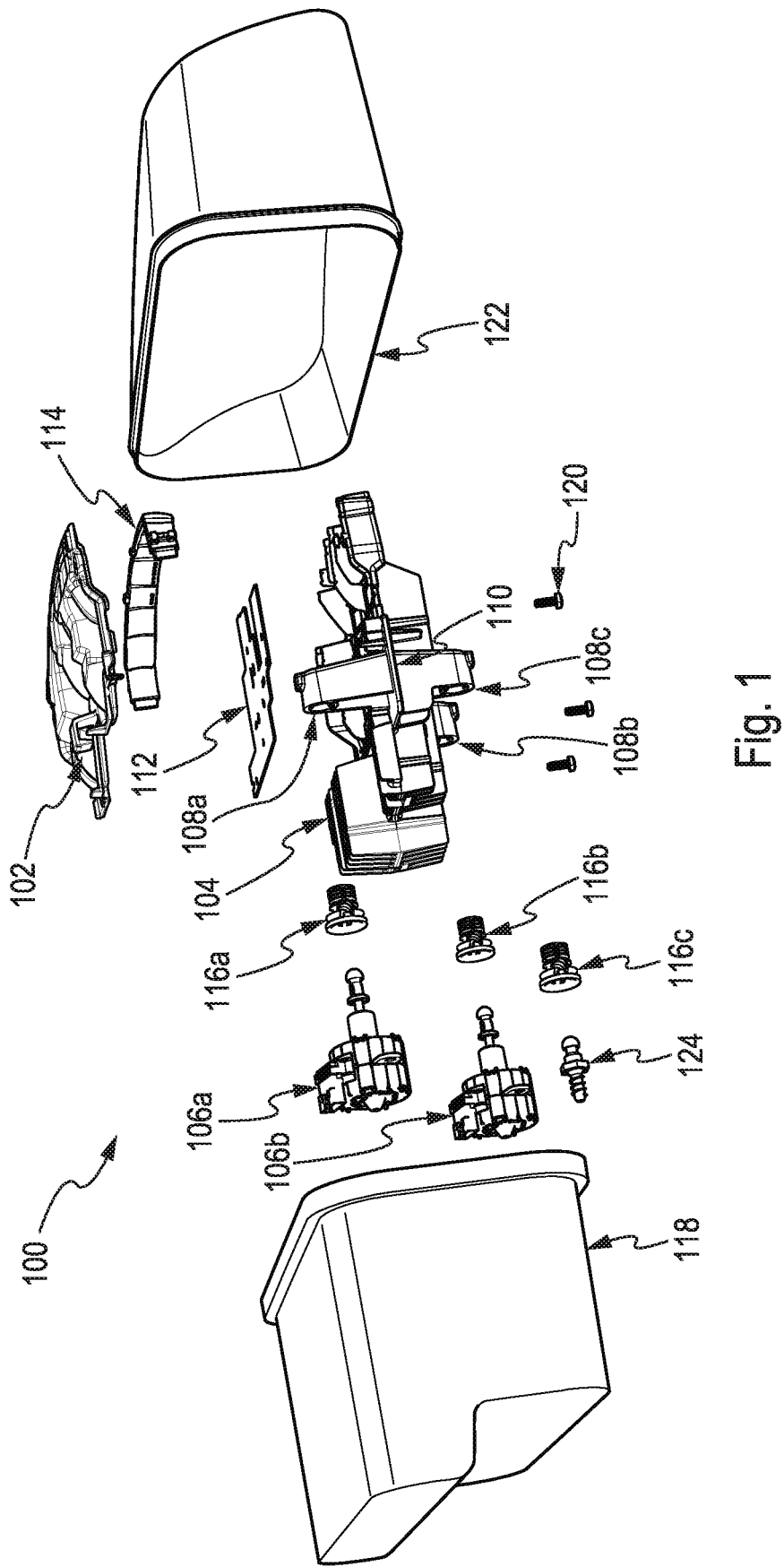
FIG. 1 shows an exploded view of a lighting apparatus, according to an embodiment of the present invention.

FIG. 1 shows an exploded view of a lighting apparatus 100, according to an embodiment of the present invention. In an embodiment, the lighting apparatus 100 can be a headlamp of an automotive vehicle. The exemplary lighting apparatus 100 can include a light source (not shown in Figure), a reflector 102, a heat sink 104, a plurality of actuators (106a, 106b), a plurality of pivots (108a, 108b, 108c), a stub 124, and a housing 118. The heatsink 104 can include the plurality of pivots (108a, 108b, 108c) provided on at least a plurality of edges 110 of the heatsink 104. The heatsink 104 can also include a plurality of modules (not shown in figure) to accommodate the light sources. The plurality of actuators (106a, 106b) are positioned within the housing 118 such that each of the plurality of actuators (106a, 106b) is engaged with one of the plurality of pivots (108a, 108b). In an embodiment, each of the plurality of actuators (106a, 106b) can be engaged with one of the plurality of pivots (108a, 108b) of the heatsink 104 through vertical point capsules (116a, 116b116c). In another embodiment, the heat sink 104 can be attached with the housing 118 of the lighting apparatus 100 via the stub 124 coupled with the vertical point capsule 116c to one of the plurality of pivots 108c. In an embodiment, the heatsink 104 can be adapted to receive the reflectors 102 and a printed circuit board PCB (112). The PCB 112 can include at least one light source mounted and configured to emit light. In an embodiment, the light source can represent a solid-state lighting device such as for example, a light emitting diode (LED). An inner lens 114 is provided on the lighting apparatus 100 such that the light emitted from the light source can pass through the inner lens 114. The light emitted from the light source can be reflected by the reflector 102 before passing through the inner lens 114. In an embodiment, the reflector 102, the PCB 112, the lens 114 and other components of the lighting apparatus 100 can be assembled on the heatsink 104. In another embodiment, the reflector 102, the PCB 112, the lens 114 and other components of the lighting apparatus 100 can be assembled independent from the heatsink 104. In an embodiment, the reflector 102, the PCB 112, the lens 114 and other components of the lighting apparatus 100 can be assembled on the heatsink 104 via a fastening element such as for example a set of screws 120. The lighting apparatus 100 can further include an outer lens 122 to transmit light from the inner lens 114. In one embodiment, the outer lens 122 can be assembled with the housing 118 such that the outer lens 122 and the housing 118 can represent an enclosure for the lighting apparatus 100. The lighting apparatus 100 can be adjusted by utilizing the plurality of actuators 106a, 106b engaging with the heatsink 104 located within the housing 118, thereby eliminating the need for adjusters external to the lighting apparatus 100. In an embodiment, the heatsink 104 can be designed to channelize light output from the light source. The structure of heatsink 104 is explained with reference to FIG. 2.

Figure 2:
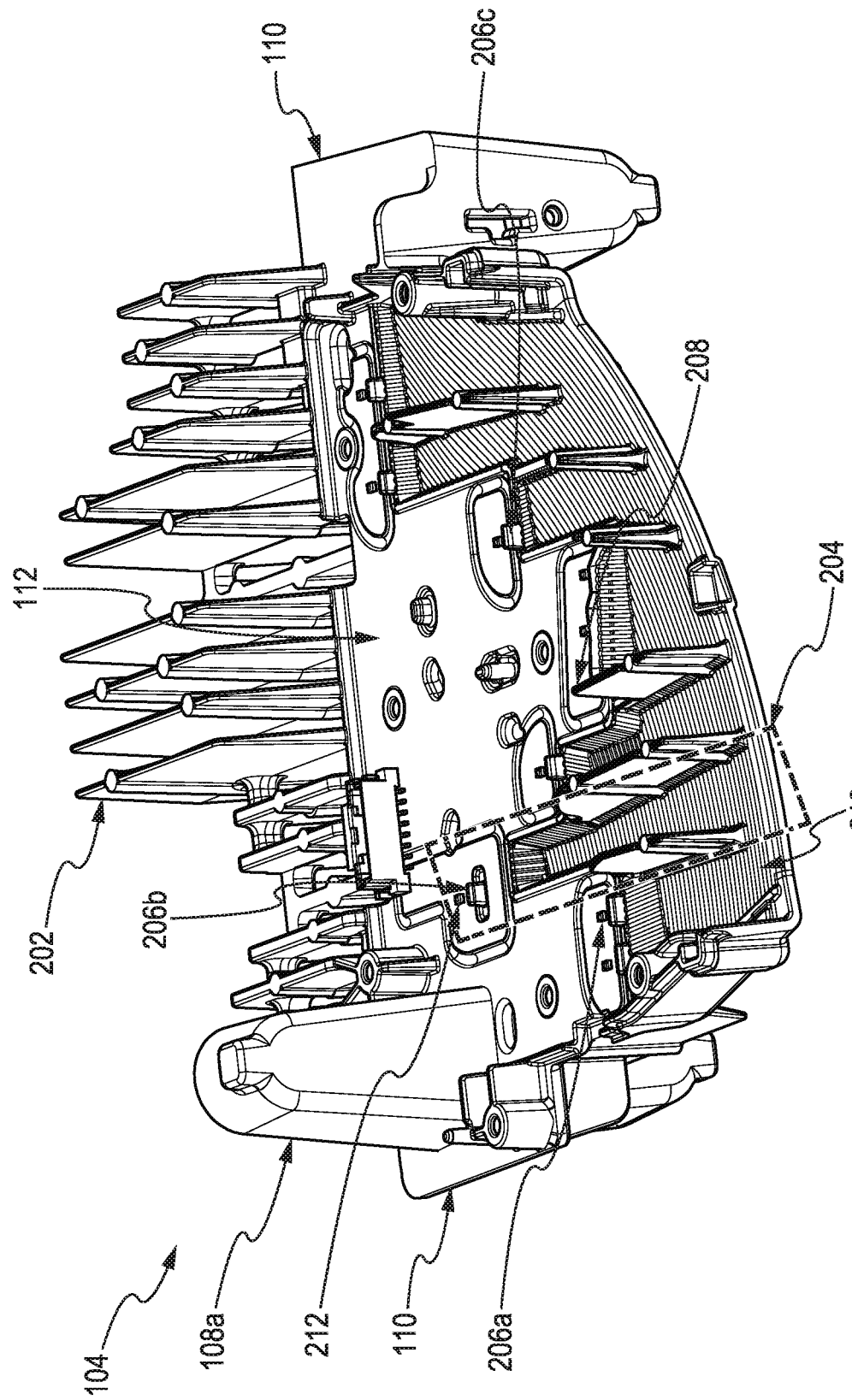
FIG. 2 shows a front perspective and detail view of a heatsink configured in the lighting apparatus, according to an embodiment of the present invention.

FIG. 2 shows a front perspective and detail view of a heatsink 104 configured in the lighting apparatus 100, according to an embodiment of the present invention. The heatsink 104 includes the plurality of pivots 108a, and a plurality of fins 202 extending outward and perpendicular from the plurality of edges 110. In an embodiment, the plurality of edges 110 can act as a base providing support such that the plurality of fins 202 and other components such as for example the PCB 112 of the lighting apparatus 100 can be mounted on top of the base of the heatsink 104. The plurality of fins 202 dissipates heat generated from the light source 212 mounted on the PCB 112. As can be seen from the FIG. 2, the PCB 112 can be mounted on the heatsink 104 such that heat generated by the light source 212 is transferred to the heatsink 104 by conduction. In an embodiment, the heatsink 104 can be made of a thermally conductive material to facilitate heat transfer from the light sources to the heatsink 104. In an embodiment, the heatsink 104 can include a plurality of modules 204 to accommodate the light source 212. In another embodiment, the plurality of modules 204 can include a plurality of light blockers (206a, 206b, 206c) and a plurality of separators 208. In one embodiment, the plurality of light blockers (206a, 206b, 206c) are provided within the heatsink 104 in close vicinity to the light source 212. The plurality of light blockers (206a, 206b, 206c) are configured to block hotspots generated by the light sources 212. In another embodiment, the plurality of separators 208 can be provided within the heatsink 104 in close vicinity of the light source 212. The plurality of separators 208 ensures light emitted from the light source 212 can be channeled for aiming. In addition, the plurality of separators 208 prevents unwanted mixing of light emitted from one light source 212 with other light sources. As can be seen from the FIG. 2, a portion 210 of the heatsink 104 between the plurality of separators 208 can be textured to reduce reflectivity of light emitted from the light sources and reflected by the reflectors (not shown in figure). An enlarged view of the heatsink 104 arrangement with the plurality of modules 204 is explained in more detail with respect to FIG. 3.

Figure 3:
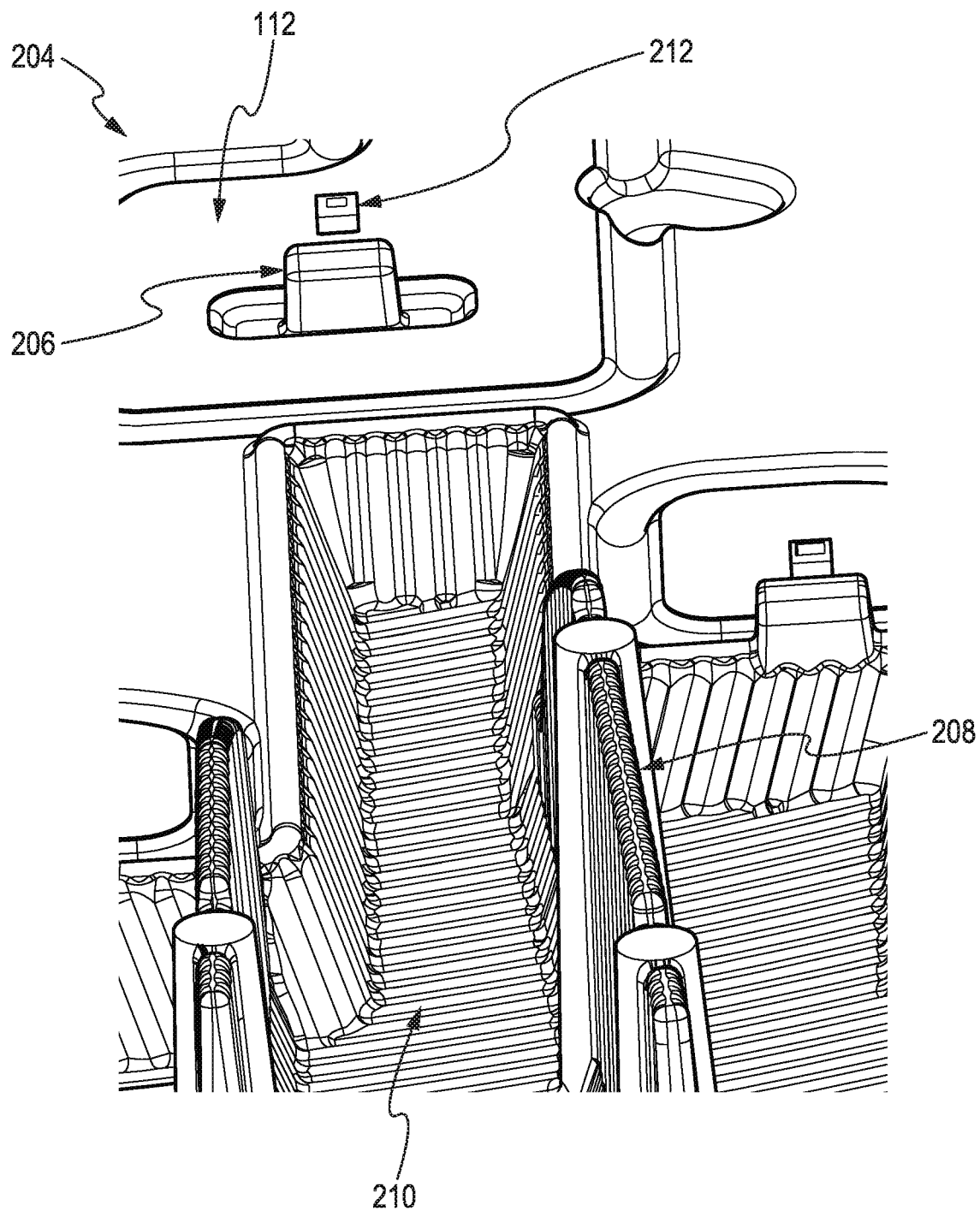
FIG. 3 shows an enlarged view of a portion of the heatsink configured in the lighting apparatus, according to an embodiment of the present invention.

FIG. 3 shows an enlarged view of a portion of the heatsink 104 configured in the lighting apparatus 100, according to an embodiment of the present invention. The portion of the heat sink 104 shown in FIG. 3 relates to one of the plurality of modules 204. The one of the plurality of modules 204 includes the light source 212 mounted on the PCB 112. The PCB 112 can be disposed on the heatsink 104 such that heat generated from the light source 212 is transferred to the heatsink 104 through direct contact. In one embodiment, the plurality of modules 204 can include the light blocker 206 disposed in front of the light source 212. The light blocker 206 ensures hotspot arising due to excessive luminance in front of the light source 212 can be eliminated. In another embodiment, the light emitted from the light source 212 can be channelized by the plurality of modules 204 of the heatsink 104 by utilizing the plurality of separators 208. In an embodiment, the separators 208 can be provided between the light source 212 such that mixing of light emitted from one light source 212 with the other is prevented. In one embodiment, the portion 210 of the heatsink 104 between the plurality of separators 208 can be textured to reduce reflectivity. In another embodiment, the portion 210 of the heatsink 104 between the plurality of separators 208 can be polished or coated with a reflective material. The reflective coating or polishing provided on the portion 210 between the plurality of separators 208 enables the heatsink 104 to reduce the reflectivity of the light reflected from the reflectors thereby ensuring light emitted from the LED 212 is optimized towards the inner lens (not shown in figure) of the lighting apparatus 100. Therefore, the plurality of modules 208 enables the lighting apparatus 100 to turn-ON and turn-OFF multiple LEDs 212 simultaneously along with preventing unwanted light mixing between the light source 212.

Figure 4:
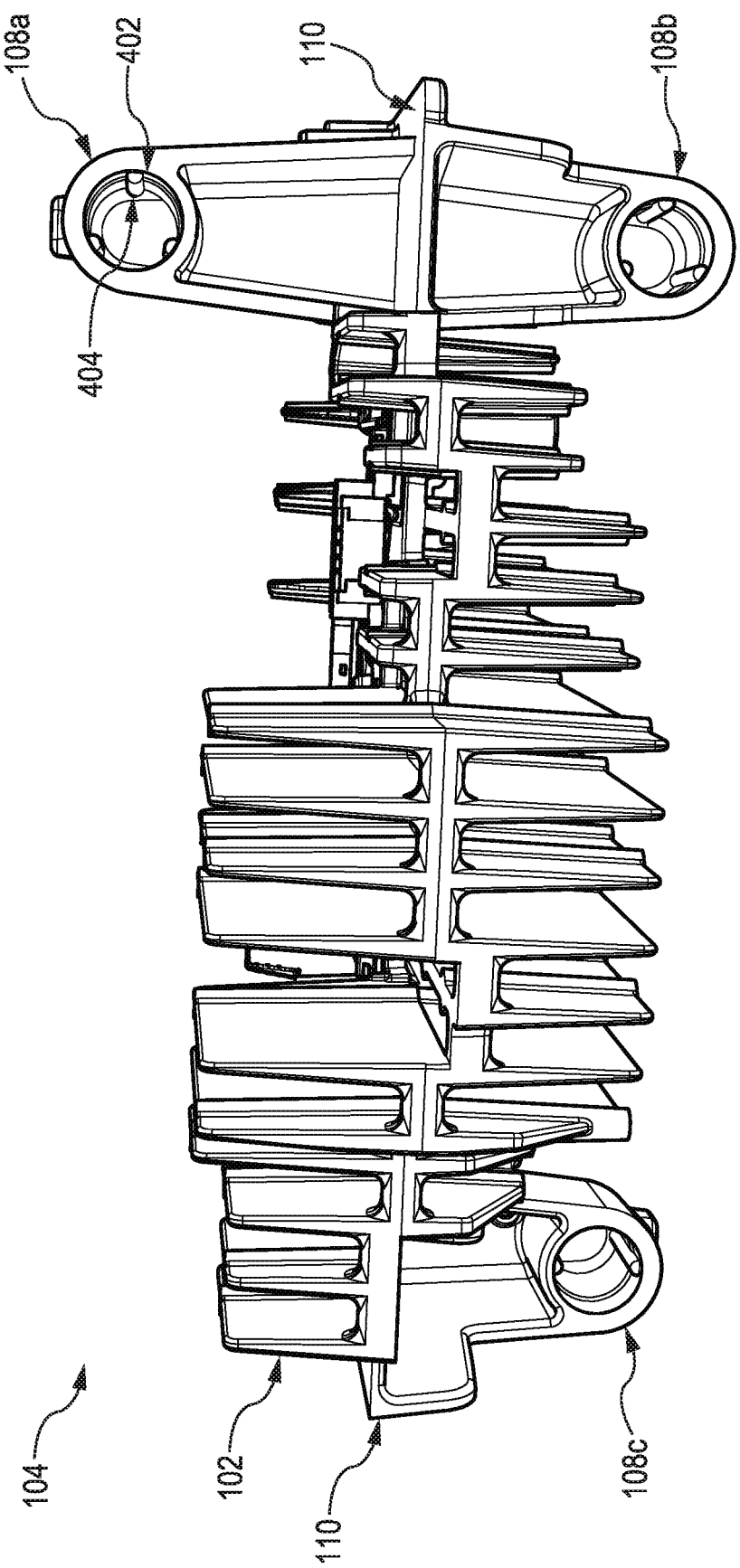
FIG. 4 shows a back perspective and detail view of a heatsink configured in the lighting device, according to an embodiment of the present invention.

FIG. 4 shows a back perspective and detail view of the heatsink 104 configured in the lighting apparatus 100, according to an embodiment of the present invention. In an embodiment, the plurality of fins 202 extend perpendicularly outward from the plurality of edges 110. In an embodiment, the plurality of fins 202 of the heatsink 104 can be manufactured by an extrusion process. In an embodiment, the plurality of edges 110 and the plurality of fins 202 can be manufactured by forging. In an embodiment, the plurality of edges 110 and the plurality of fins 202 can be manufactured by stamping. In an embodiment, the plurality of edges 110 and the plurality of fins 202 can be manufactured by casting.

The heatsink 104 can further include a plurality of pivots 108a, 108b, 108c extending perpendicular from the plurality of edges 110. In an embodiment, the heatsink 104 having the plurality of pivots 108a, 108b, 108c can be manufactured by extrusion process. In an embodiment, the heatsink 104 having the plurality of pivots 108a, 108b, 108c can be manufactured by one or a combination of known manufacturing processes described in previous embodiments. In an embodiment, each of the plurality of pivots 108a, 108b, 108c can include an aperture 402 having one or more indexing feature 404 . . . . The one or more indexing feature 404 can secure the heatsink 104 with the actuators 106a, 106b thereby enabling the lighting apparatus 100 to be moved in various directions. In one embodiment, the actuators 106a, 106b and the stub 124 can be configured to control position of the heatsink 104 in X-axis, Y-axis, and Z-axis directions, either alone or in a combination to aim the lighting apparatus 100. In an embodiment, the plurality of actuators 106a, 106b can be a stepper motor. In an example embodiment, the stub 124 along with the vertical capsule 116c can ensure the lighting apparatus 100 is provided with a fixation that is immobile. In another embodiment, the pivot 108a engaging with the vertical capsule 116a and the actuator 106a can enable vertical movement of the lighting apparatus 100. In yet another embodiment, the pivot 108b engaging with the vertical capsule 116b and the actuator 106b can enable horizontal movement of the lighting apparatus 100. Therefore, movement of the lighting apparatus 100 can be controlled by the actuators 106a, 106b and the stub 124 disposed within the housing 118 thereby eliminating the need for external adjusters. Thus, manufacturing cost associated when having components such as external brackets and external adjustors in the lighting apparatus 100 is reduced. Furthermore, the reduced components and engagement of the plurality of pivots with the plurality of actuators 106a 106b can improve vibration resonance frequency of the lighting apparatus 100.

Figure 5:
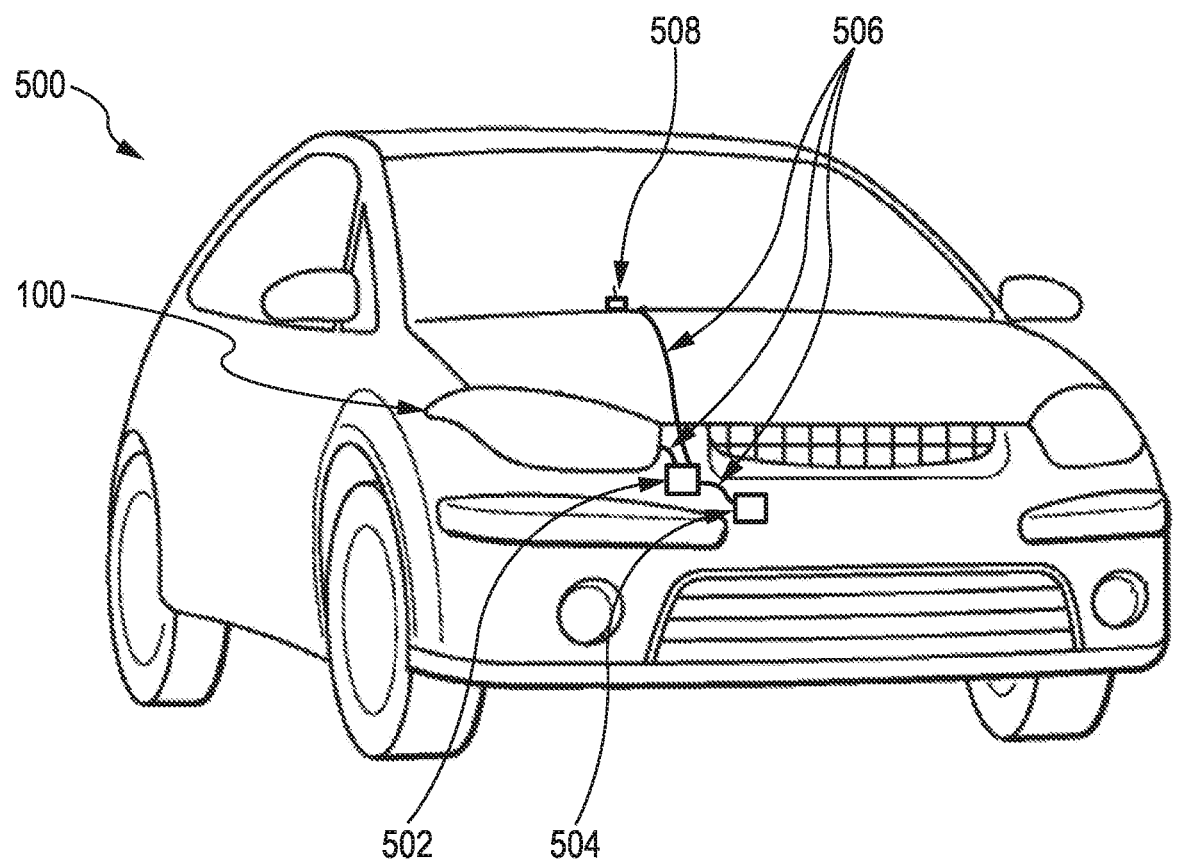
FIG. 5 shows a principal view of the lighting apparatus assembled on an automotive vehicle, according to an embodiment of the present invention.

FIG. 5 shows a principal view of the lighting apparatus 100 assembled on an automotive vehicle 500, according to an embodiment of the present invention . . . In an embodiment, the lighting apparatus 100 of the automotive vehicle 500 can be controlled by a controller 502. In one embodiment, the controller 502 is outside the headlamp 100 and connected to the headlamp 100 via a vehicle communication means 506. The vehicle communication means 506 can be implemented with any communication or network protocol, for example, a wired communication line, ad hoc networks, wireless access within the vehicle, cellular networks, Ethernet communication, a Controller Area Network (CAN) bus protocol such as Unified Diagnostic Service (UDS) ISO 14229, Wi-Fi networks (e.g., IEEE 802.11), Bluetooth, Wireless Access in Vehicular Environments (WAVE), Communication Access For Land Mobiles (CALM), among others. Further, the vehicle communication means 506 can be a vehicle-to-vehicle (V2V) or a vehicle-to-everything (V2X) communication protocol. In another embodiment, the controller 502 is integrated into the headlamp 100. The controller 502 can be configured to actuate the plurality of actuators 106a, 106b to position the heatsink 104 within the housing 118. The controller 502 can be an Electronic Control Unit (ECU). The ECU can include at least one Central Processing Unit ("CPU" or "processor") and a memory storing instructions executable by the at least one processor. The processor can comprise at least one data processor for executing program components for executing user or system-generated requests.

The controller 502 can be connected to a switching means 508 disposed on a dashboard via the communication means 506. The switching means can be utilized by a driver of the automotive vehicle 500 to move the lighting apparatus 100 in various directions for adjusting the light beam. In one embodiment, the switching means 508 can be for example, a conventional analog/manual switch. In another embodiment, the switching means 508 can be a digital switch such as for example an Application Programming Interface (API) implemented on a portable electronic device. In one embodiment, the portable electronic device can be a mobile phone, a display, a smart watch, a tablet, a laptop, a display system with a memory and a processor, and the like. In one embodiment, when the switch is an analogue/manual switch, the driver can mechanically turn-ON the switching means 508 on the dashboard of the automotive vehicle 500 for aiming the lighting apparatus 100. In another example embodiment, the analogue/manual switch can be a stalk that acts like a joystick to adjust the lighting apparatus 100 of the automotive vehicle 500. Subsequently, an activation signal is sent to the controller 502 via the communication means 506 to control the lighting apparatus 100 of the automotive vehicle 500. In an embodiment, the controller 502 can be configured to actuate at least one of the plurality of actuators 106a, 106b based on the activation signal from the switching means thereby adjusting the lighting apparatus 100. In an embodiment, the controller 502 can be configured to move the plurality of actuators 106a, 106b in a predetermined position such as for example a 10 degree displacement from the horizontal and vertical axis. In another embodiment, when the driver turn-OFF the switching means, the plurality of actuators 106a, 106b can be configured to be returned back to original position. The original position can be a factory setting of the lighting apparatus 100.

In another embodiment, the controller 502 can be connected with a sensor system 504 via the communication means 506. The sensor system 504 can be part of an adaptive driving system (not shown in Figure) that is activated by the driver of the automotive vehicle 500. The driver can activate the adaptive driving system by the switching means 508. In one embodiment, when the driver turns-ON the switching means 508, the adaptive driving system can be activated which turns-ON the sensor system 504 to provide data on at least one road parameter such as curvature of road, inclination of road, objects on road or the like. In another embodiment, when the driver activates the adaptive driving system via the digital switching means, the road parameter data from the sensor system 504 can be transmitted to the Application Programming Interface (API) of the portable electronic device. In yet another embodiment, the controller 502 can be configured to actuate at least one of the plurality of actuators 106a, 106b based on the road parameter data provided by the sensor system 504. In still another embodiment, the driver can adjust the plurality of actuators 106a, 106b based on the road parameter data being displayed on the portable electronic device. Therefore, the driver of the automotive vehicle 500 can control movement of the lighting apparatus 100 in different directions in real time. In one embodiment, the driver can turn-OFF the plurality of actuators 106a, 106b by turning OFF the switching means 508 thereby returning the lighting apparatus 100 back to original position. In another embodiment, driver using the API of the portable electronic device can have an option to turn-OFF the digital switching means and select analogue/manual switching means.

Although the present disclosure provides references to figures, all embodiments shown in the figures are intended to explain preferred embodiments of the present invention by way of example rather than being intended to limit the present invention. Preferred embodiments of the present invention have been disclosed. However, it should be apparent to a person of ordinary skill in the art that certain modifications would come within the teachings of this invention and that various changes or modifications can be made in the present disclosure without departing from the principles and spirit of the disclosure, which are intended to be covered by the present invention as long as these changes or modifications fall within the scope defined in the claims and their equivalents.

LIST OF ELEMENT NUMBERS

Lighting Apparatus 100
Reflector 102
Heat sink 104
Plurality of Actuators 106a, 106b
Plurality of Pivots 108a, 108b, 108c
Plurality of Edges 110
Printed Circuit Board (PCB) 112
Inner Lens 114
Vertical Point Capsules 116a, 116b, 116c
Housing 118
Screws 120
Outer Lens 122
Plurality of Fins 202
Plurality of Modules 204
Plurality of Light Blockers 206a, 206b, 206c
Plurality of Light Separators 208
Part between plurality of separators 210
Light Sources 212
Aperture 402
One or more Indexing Feature 404
Automotive Vehicle 500
Controller 502
Sensor System 504
Communication means 506
Switching means 508

We claim:

1. A headlamp for an automotive vehicle, the headlamp comprising:
a housing;
an outer lens;
at least one light source;
two powered actuators, with the two powered actuators being located within the housing; and
a heatsink, with the heatsink including at least one module to accommodate the at least one light source and three pivots configured to engage with the two powered actuators and a stub for positioning the heatsink to aim the at least one light source, the heatsink also including a light blocker between the at least one light source and the outer lens that blocks light rays from the at least one light source from directly exiting the outer lens and the at least one module including features to guide and shape a light emitted by the at least one light source.

2. The lighting apparatus of claim 1, wherein the heatsink further includes an aperture on the three pivots such that the heatsink is adapted to receive the plurality of actuators to be engaged to the three pivots through the aperture.

3. The lighting apparatus of claim 2, wherein the three pivots being engaged with the plurality of powered actuators is configured to move the lighting apparatus in different directions.

4. The lighting apparatus of claim 1, wherein the heatsink includes a plurality of fins extending outward from the plurality of edges.

5. The lighting apparatus of claim 1, wherein at least a portion of the heatsink is textured to reduce reflectivity.

6. The lighting apparatus of claim 1, wherein at least a portion of the heatsink is polished or coated with a reflective material.

7. The lighting apparatus of claim 1, wherein the powered actuators control position of the heatsink in X-axis, Y-axis, and Z-axis directions, either alone or in a combination to aim the lighting apparatus.

8. The lighting apparatus of claim 1, wherein a plurality of light blockers are provided within the heatsink in close vicinity to the light source.

9. The lighting apparatus of claim 1, wherein a plurality of separators are provided within the heatsink in close vicinity of the plurality of modules.

10. The lighting apparatus of claim 1, wherein the heatsink is made of a thermally conductive material.

11. The lighting apparatus of claim 1, wherein each of the plurality of powered actuators is a stepper motor.

12. The lighting apparatus of claim 1 further comprises an external controller to actuate the plurality of actuators to position the heatsink within the housing.

* * * * *